No. 747,141. PATENTED DEC. 15, 1903.
J. R. CLAYTON.
EYEGLASSES.
APPLICATION FILED SEPT. 21, 1903.
NO MODEL.

Witnesses
Inventor
J. R. CLAYTON.
By
Attorneys

No. 747,141. Patented December 15, 1903.

UNITED STATES PATENT OFFICE.

JOHN R. CLAYTON, OF SHELBYVILLE, INDIANA.

EYEGLASSES.

SPECIFICATION forming part of Letters Patent No. 747,141, dated December 15, 1903.

Application filed September 21, 1903. Serial No. 174,064. (No model.)

*To all whom it may concern:*

Be it known that I, JOHN R. CLAYTON, a citizen of the United States, residing at Shelbyville, in the county of Shelby and State of Indiana, have invented certain new and useful Improvements in Eyeglasses; and I do hereby declare the following to be a full, clear, and exact description of the invention, such as will enable others skilled in the art to which it appertains to make and use the same.

This invention relates to eyeglasses, and more particularly to the means for holding the several parts thereof in operative relation, and has for its object to provide a holding means which will do away with the use of screws and which when once in position will be assured against accidental displacement. In the form of glasses known as "pincenez" it is at present customary to secure the bow and the nose-guard to the post carried by the rim by means of a screw, which when subjected to the strain incident to placing the glasses upon the nose quickly works loose, thus permitting movement of the glass with relation to the bow. This movement changes the focus of the glass and renders it less efficient. Various attempts have been made to provide a means which would obviate the possibility of loosening of the screw; but as yet it is not known that any one has been successful.

It is the intention in the present invention to entirely do away with the screw and to substitute therefor the mechanism described below.

Figure 1:
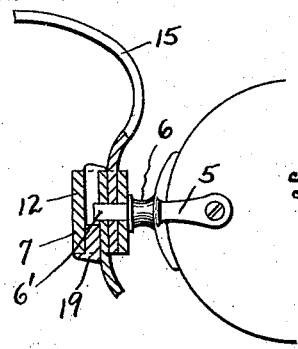
Figure 2:
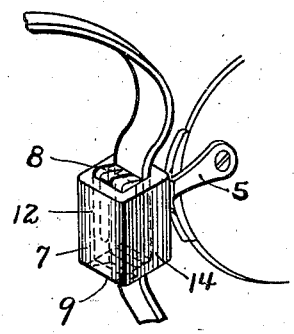
Figure 3:
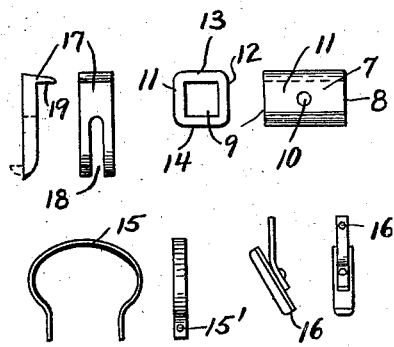
Figure 4:
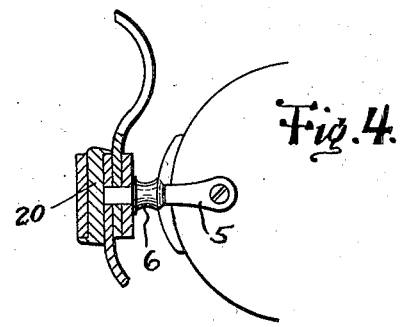
Figure 5:
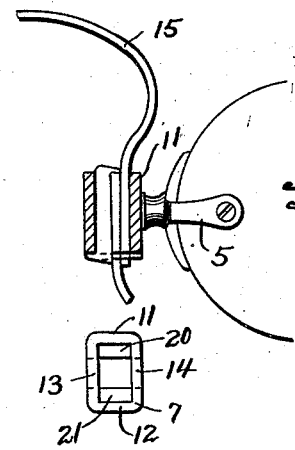
Figure 6:
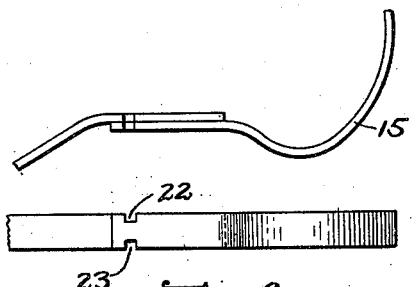

In the drawings forming a portion of this specification, in which like numerals of reference indicate similar parts in the several views, Figure 1 is an enlarged section of the fastening means, showing several parts assembled. Fig. 2 is a perspective view of the fastening means and the adjacent parts of the glasses. Fig. 3 is a detail of the several portions of the fastening means. Fig. 4 is a sectional view of a modified form of the device. Fig. 5 is a view similar to Fig. 4, showing a second modification. Fig. 6 is a view of the end of the nose-guard used in the construction shown in Fig. 5.

Referring now to the drawings, there is shown the customary rim 5, upon which is mounted the post 6. A box or sleeve 7 is provided, which is open at two of its ends 8 and 9, which has a perforation 10 in its face 11. This face 11 and the opposite face 12 are somewhat wider than the remaining faces, which may be designated by the numerals 13 and 14, respectively.

The sleeve 7 is disposed with its perforation 10 upon the post 6, to which it may be soldered or secured in any desired manner, and is so positioned that the end 6' of the post is but slightly spaced from the inner face of the side 12 of the sleeve.

The bow 15 and the nose-guard 16, used in connection with the present invention, are of the customary form and are provided with the usual perforations 15' and 16', respectively.

In connection with the parts already described there is also employed a wedge 17, which is bifurcated at one of its ends, as shown at 18, and which has a laterally-directed nose 19 at its opposite end.

In assembling the parts, it being understood that the sleeve 7 is already secured to the post 6, the bow 15 and the nose-guard 16 are disposed with their perforations upon that portion of the post 6 which lies inwardly of the sleeve, the end of the post being sufficiently spaced from the inner face of the side 12 to permit of the passage of these members therebetween. The wedge 17 is then disposed between the upper face of the nose-guard and the inner face of the side 12 and lies with one of its bifurcations at either side of the end 6' of the post. Pressure is now brought upon the end of the wedge which carries the nose 19, and the wedge is thus forced into the casing, and thus tightly holds the several parts together. The ends of the bifurcated portions which project beyond the sleeve 7 may then be bent, as shown, to prevent accidental displacement of the wedge.

In Fig. 4 of the drawings there is shown a modified form of the device, in which the bifurcated wedge 17 is replaced by a solid wedge 20, in this case the portion of the post 6 which lies within the sleeve 7 being of a length equal to the combined thickness of the bow and nose-guard. The end 6' of the post thus lies flush with the upper face of the nose-guard when the wedge is inserted.

In Fig. 5 there is shown another modification, the operation of which is somewhat different from the forms described above. In this construction the post 6 does not enter the sleeve 7, but is secured to the face 11 thereof. The sleeve 7 is secured to the inner faces of its walls 13 and 14 and has a pair of wings 20 and 21 projecting from the inner faces of the walls 11 and 12, which are spaced from each other at their inner edges and which terminate at their upper ends slightly below the face 12, their lower ends resting upon the face 11. In connection with this form are used a nose-guard and bow the ends of which are slotted, as shown at 22 and 23 in Fig. 6. In assembling the parts the ends of the bow and nose-guard are disposed with their slots engaged with the wings 20 and 21, which may be done by inserting them in the space between the upper ends of these wings and the face 12 until the slots are in alinement with the wings, when the bow and nose-guard may be lowered, the portion between the slots then occupying the space between the wings. The wedge used in this form is of a size to enter between the wings and is inserted in the same manner as that in the previously-described forms.

In practice modifications of the specific construction shown may be made, and any suitable material and proportions may be used for the various parts without departing from the spirit of the invention.

What is claimed is—

1. In an eyeglass-fastening, the combination with a post adapted for connection with a glass and having a sleeve at its outer end and a pin projecting from the wall of the sleeve next to the post, of a bow and a nose-guard engaged over the pin within the sleeve and removable over the free end of the pin and a wedge disposed between said engaging members and the wall of the sleeve opposite to the pin, whereby said members will be held against removal from the pin.

2. In an eyeglass-fastening, the combination with a post adapted for attachment to a glass and having a receiving member, a bow member and a guard member entering the receiving member, a pin carried by one of said members and removably engaged with the other members, and a wedge engaged in the receiving member and disposed to hold the members in engagement with the pin.

3. In an eyeglass-fastening, the combination with a post adapted for connection with a glass and having a sleeve at its outer end and a pin projecting from the wall of the sleeve next to the post, of a bow and a nose-guard engaged over the pin within the sleeve and removable over the free end of the pin, and a forked wedge disposed between said engaging members and the wall of the sleeve opposite to the pin and straddling the latter, whereby said members will be held against removal from the pin.

4. In an eyeglass-fastening, the combination with a post adapted for attachment to a glass and having a receiving member, a bow member and a guard member entering the receiving member, a pin carried by one of said members and removably engaged with the other members, and a forked wedge engaged in the receiving member and disposed to hold the members in engagement with the pin, the opening of the wedge lying opposite to the end of the pin.

In testimony whereof I affix my signature in presence of two witnesses.

JOHN R. CLAYTON.

Witnesses:
G. W. F. KIRK,
CHAS. W. HARRISON.